May 27, 1924.
A. H. WYATT
CAM
Filed March 5, 1923
1,495,945
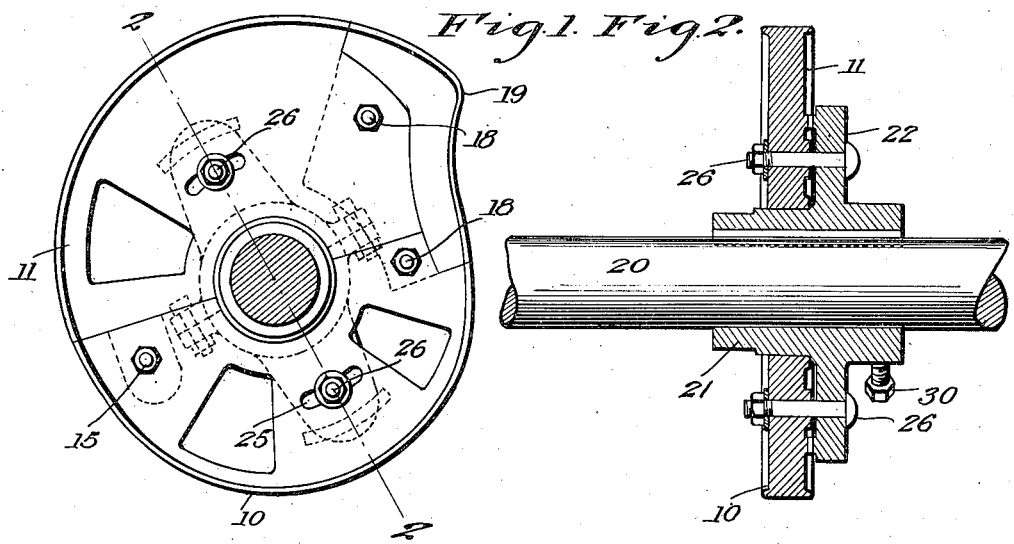
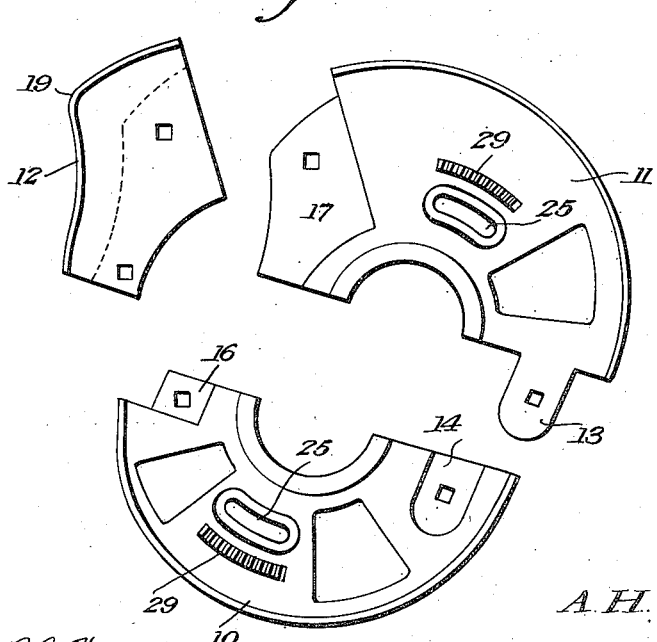
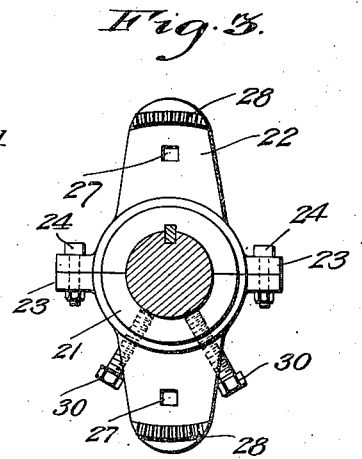
A. H. Wyatt. INVENTOR Patented May 27, 1924.

1,495,945

UNITED STATES PATENT OFFICE.

ARTHUR HEZKIAH WYATT, OF WHITMIRE, SOUTH CAROLINA.

CAM.

Application filed March 5, 1923. Serial No. 622,937.

*To all whom it may concern:*

Be it known that I, ARTHUR H. WYATT, a citizen of the United States, residing at Whitmire, in the county of Newberry and State of South Carolina, have invented new and useful Improvements in Cams, of which the following is a specification.

This invention relates to cams and has especial relation to picker cams for looms.

An object of the invention is to provide a cam of this character which may be removed from and replaced upon its shaft within a relatively short time and with a minimum amount of labor.

Another object of the invention is the provision of a sectional cam whose sections may be removed and replaced, so that in the event of breakage, it is only necessary to replace the broken section, with a result of considerable saving, especially as the picker point section of the cam is subjected to great wear.

With the above and other objects in view, the invention further includes the following novel features and details of construction, to be hereinafter more fully described, illustrated in the accompanying drawings and pointed out in the appended claims.

In the drawings:—

Figure 1 is an elevation of a cam constructed in accordance with the invention.

Figure 2 is an enlarged sectional view on the line 2—2 of Figure 1.

Figure 3 is a detail elevation of the bushing for securing the cam upon a shaft.

Figure 4 is an elevation of the cam with the parts separated.

Referring in detail to the drawings, wherein like characters of reference denote corresponding parts, the improved cam is shown as comprising sections 10, 11 and 12. The section 11 of the cam has extending therefrom a lug 13, which is adapted to enter a socket 14 provided in the adjacent portion of the section 10 and to be secured within this socket by means of a bolt 15.

The cam sections 10 and 11 are also recessed as shown at 16 and 17 respectively and these recessed portions receive the opposite ends of the cam section 12, so that the latter will snugly fit therein and will be held in place by means of bolts 18 which pass through openings provided in the section 12 and the sections 10 and 11. The section 12 is enlarged as shown at 19 to provide a picker point which extends beyond the periphery of the sections 10 and 11 and forms the usual cam picker point.

For the purpose of removably and adjustably connecting the cam to the shaft 20, there is provided a bushing 21 which is keyed to the shaft and which has extending therefrom diametrically disposed wings 22. The bushing is split and provided with oppositely extending ears 23 for the passage of bolts 24 so that the bushing may be conveniently secured in place. The cam sections 10 and 11 are provided with concentrically arranged arcuate slots 25 for the passage of bolts 26 and the latter extend through openings 27 provided in the wings 22. This provides means whereby the cam may be rotatably adjusted with respect to the shaft 20. The wings 22 are provided with outwardly extending toothed flanges or racks 28 which are arranged concentrically with the shaft 20 and which are adapted to engage similarly arranged teeth 29 extending from the cam sections 10 and 11. The engagement of the teeth 28 and 29 acts to prevent accidental rotary movement of the cam with respect to the shaft, after adjustment has been effected. Set screws 30 which extend through the bushing 21 and engage the shaft, act to hold the bushing and consequently the cam against longitudinal movement.

It will be apparent from the foregoing description and accompanying drawings that this picker point may be replaced when necessary, or in the event of breakage of any of the sections of the cam, the said broken sections may be replaced without replacing the entire cam.

The invention is susceptible of various changes in its form, proportions and minor details of construction and the right is herein reserved to make such changes as properly fall within the scope of the appended claims.

Having described the invention what is claimed is:—

1. A picker cam for looms comprising separate cam sections including hub carrying sections and a picker point section and means including the picker point section for detachably connecting the hub carrying sections together.

2. A picker cam for looms comprising a cam split diametrically to provide separate sections, a recess formed in the adjacent end of each section, a picker point having its opposite ends shaped to fit the recesses, means for removably securing the picker point within the recesses to hold one side of the cam together and means for detachably connecting the diametrically opposite side of the cam.

3. A picker cam for looms comprising a cam split diametrically to provide separate sections, a recess formed in the adjacent end of each section, a picker point having its opposite ends shaped to fit the recesses, means for removably securing the picker point within the recesses to hold one side of the cam together, a lug extending from one of the cam sections at a point diametrically opposite the picker point and adapted to enter a socket formed in the other cam section and means for detachably securing the lug within said socket.

In testimony whereof I affix my signature.

ARTHUR HEZKIAH WYATT.